(12) United States Patent
Ryan et al.

(10) Patent No.: US 6,516,053 B1
(45) Date of Patent: Feb. 4, 2003

(54) SYSTEM AND METHOD FOR TESTING TELECOMMUNICATION SERVICE INSTALLATIONS

(75) Inventors: Arthur Ryan, Round Rock, TX (US); Rodney Cummings, Austin, TX (US); Hugo Andrade, Austin, TX (US); B. Keith Odom, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/336,932

(22) Filed: Jun. 21, 1999

(51) Int. Cl.$^7$ .......................... H04M 1/24; H04M 3/08; H04M 3/22
(52) U.S. Cl. ...................... 379/21; 379/19; 379/22.06; 379/27.07
(58) Field of Search ................................ 379/1, 10, 16, 379/19, 21, 22–29.11, 32, 34; 370/241–242, 247–252; 455/423–425; 324/511, 537, 765, 158.1, 73.1

(56) References Cited

U.S. PATENT DOCUMENTS 5,121,342 A * 6/1992 Szymborski et al. ....... 709/224
6,064,721 A * 5/2000 Mohammadian et al.
6,107,818 A * 8/2000 Czamara ..................... 324/765

OTHER PUBLICATIONS

Puckett, "Giving Testing a Boost," *Outside Plant*, Sep. 1998, pp. 52–56.
Stewart, "There's more than just testing DSL," *Outside Plant*, Sep. 1998, pp. 62–64.
Grigoropoulos, "Changing the Way We Test," *Outside Plant*, Sep. 1998, pp. 48–51.
Beougher, "More on High–Resolution TDRs," *Outside Plant*, Sep. 1998, p. 96.
TTC advertisement for T–BERD 109XC, *Outside Plant*, Sep. 1998, pp. 17–18.

* cited by examiner

Primary Examiner—Duc Nguyen
(74) Attorney, Agent, or Firm—Jeffrey C. Hood

(57) ABSTRACT

A modular telecommunication test system is presented including a portable computer system and at least one portable telecommunication test module located external to the computer system. The portable computer system stores a telecommunication test application (e.g., in a memory system). Each test module includes a communication port having an electrical connector, and is thus adapted for coupling to the portable computer system. Each test module also includes electrical circuitry for performing a set of telecommunication tests, wherein each test involves making at least one electrical measurement upon a telecommunication service installation. In coupling a given test module to the portable computer system, a user configures the test system to perform the set of telecommunication tests associated with the given test module. The at least one test module is selected from a group of test modules, each configured to perform telecommunication tests upon a different type of telecommunication service installation. Eligible types of telecommunication service installations include POTS, T1/E1, ISDN, and xDSL. The test system may also include a second computer system (e.g., a desktop computer system) coupled to the first computer system via a communication network. The communication network may include the PSTN and the Internet. The first computer may receive telecommunication test data from each test module and provide the test data to the second computer system via the communication network.

31 Claims, 9 Drawing Sheets

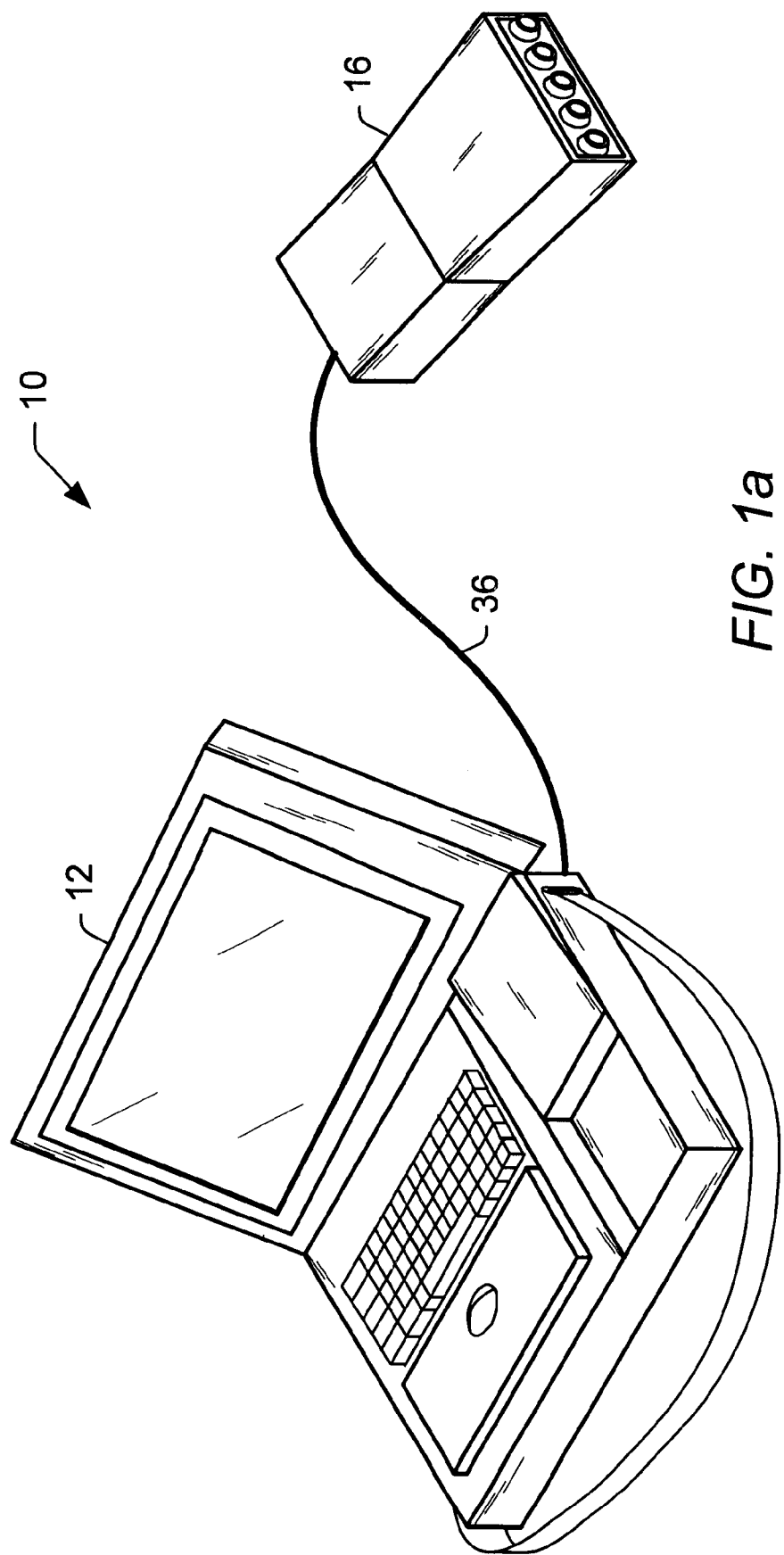

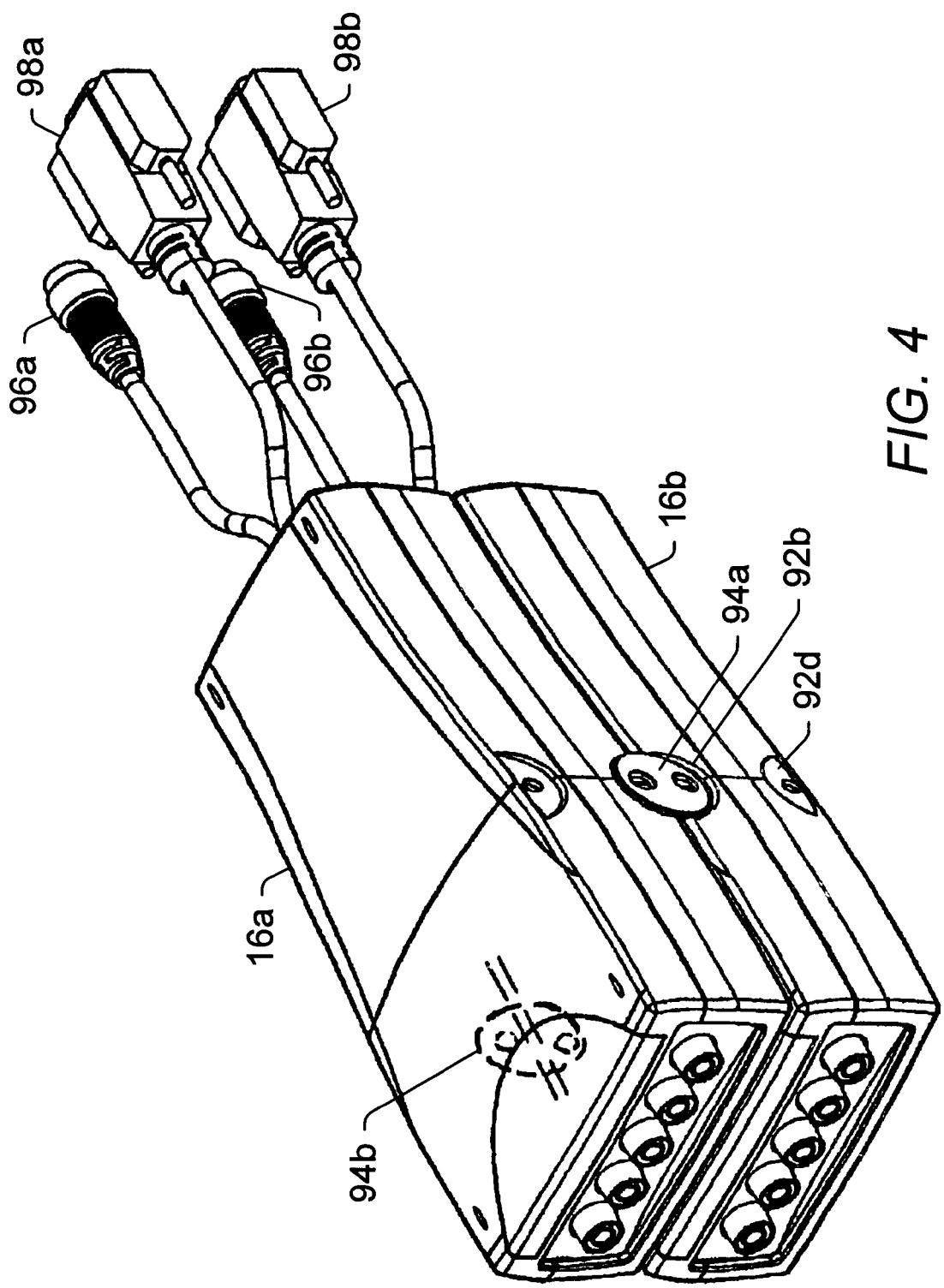

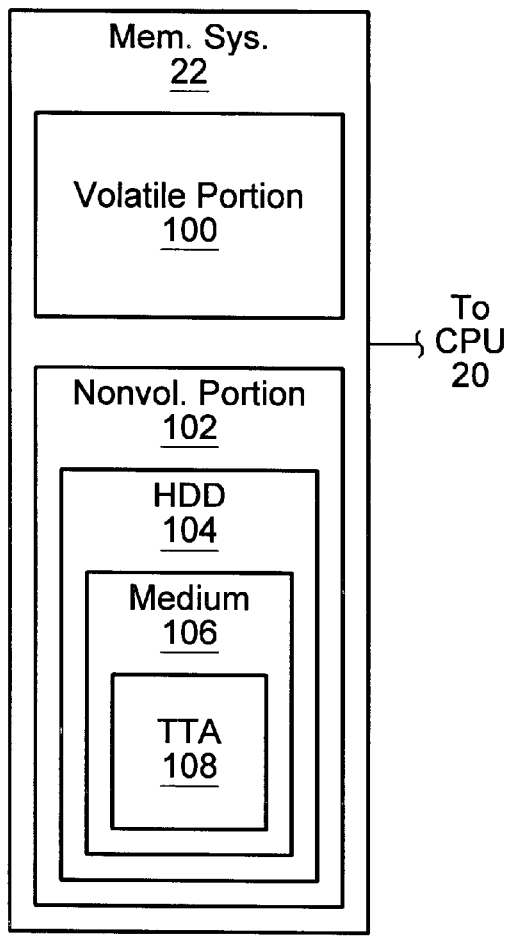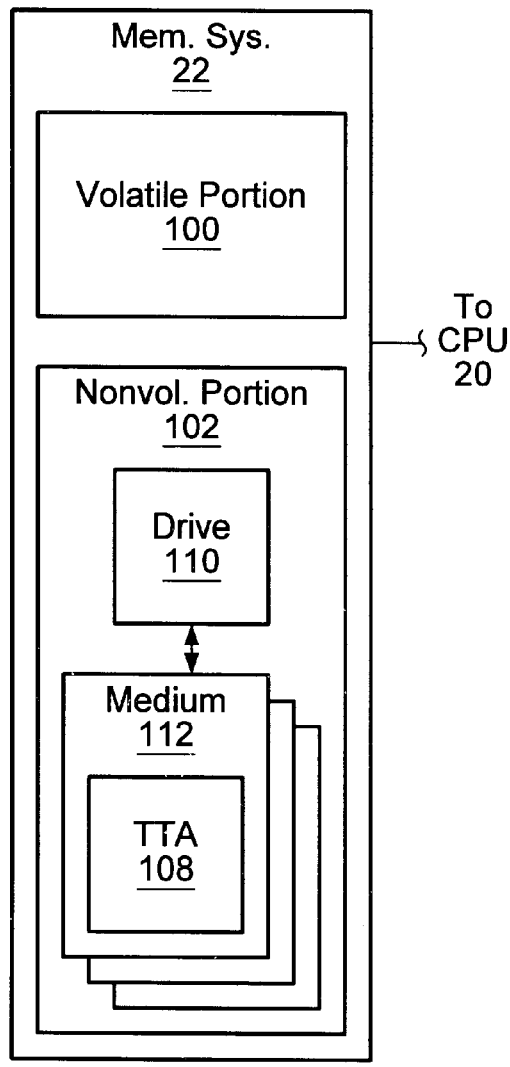
FIG. 5a
FIG. 5b

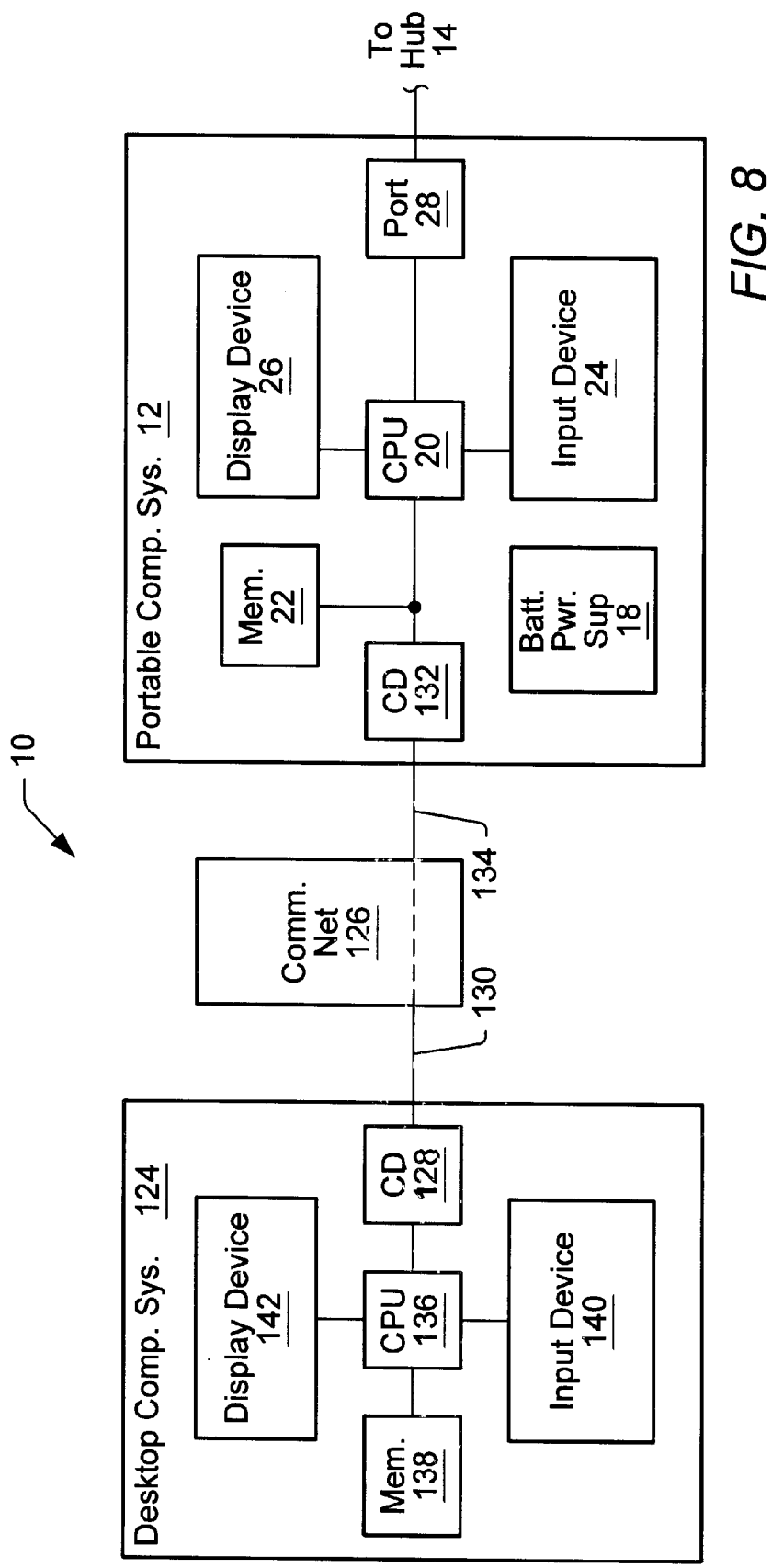

SYSTEM AND METHOD FOR TESTING TELECOMMUNICATION SERVICE INSTALLATIONS

FIELD OF THE INVENTION

The present invention relates to the field of telecommunication testing, and more particularly to a portable-computer-based telecommunication test system for testing at least one of several different types of telecommunication service installations.

DESCRIPTION OF THE RELATED ART

Increased availability of affordable digital communication hardware and software continues to fuel demand for digital data communication service. Such digital communication service may be provided via either telephone lines or wireless communication. For many people who desire to access a computer system remotely, or the Internet, the need to transfer more information in less time has outstripped the capabilities of the "plain old telephone system" (POTS). Telecommunication service technologies capable of meeting such high speed data demands include existing T1/E1 technology as well as newer technologies such as the integrated services digital network (ISDN) and several digital subscriber line technologies (e.g., ADSL, HDSL, SDSL, IDSL) referred to collectively as "xDSL".

A two-wire "local loop" typically connects a residence to a service provider's switching equipment. T1/E1 service requires two such pairs of wires. ISDN and the xDSL technologies, on the other hand, require only a single two-wire local loop. An existing POTS local loop may be capable of providing ISDN or xDSL service without modification, or may need to be upgraded to provide ISDN or xDSL service.

Testing is used to "qualify" new service installations, and to locate problems arising in existing installations. A typical existing POTS local loop is over two miles long, has over twenty splices and other connections along the way, and is the source of most service-related problems. It is not surprising that telecommunication service technicians concentrate testing efforts on local loops.

Telecommunication service technicians use widely available POTS test sets to verify proper physical connections and voice-grade transmission capabilities. As most local loops carry only analog signals within the frequency range of human speech, telecommunication service technicians will continue to require at least a POTS test set. More sophisticated telecommunication service installations, including T1/E1, ISDN, and xDSL, require more sophisticated testing equipment with capabilities beyond a POTS test set. For example, in addition to verifying proper physical connections, qualifying a new digital service such as ISDN may also require performing a bit error rate test (BERT) to verify that a predetermined sequence of digital one and zeros transmitted through the local loop is received correctly at the residence end of the local loop.

In order to reduce costs and increase technician productivity, telecommunication service providers are increasingly equipping their service technicians with portable computers (e.g., laptop PCs) for field work management, data base access, and system testing and analysis. Portable computers used in POTS testing systems in the prior art have generally been wholly proprietary and without expansion capabilities. For example, Itronix (Spokane, Wash.) offers rugged portable computers which compare, in processing and resources, with most low end laptop computers. Itronix sells a POTS tester that resides in an "oil pan" under the computer and is not sold separately. Other large telecommunication test equipment manufacturers such as TTC (Germantown, Ma.) and Hewlett Packard (Palo Alto, Calif.) have also integrated some PC technology into their field testers. For example, the model T-BERD® 109XC from TTC includes an Itronix rugged portable computer and performs POTS and ISDN testing. Several high-end POTS test sets are also capable of interfacing with a PC via an RS-232 serial communication port.

Existing computer-based telecommunication test products have generally been lacking in upgradeability, expandability, and modularity. It would thus be beneficial to have a portable-computer-based telecommunication test system which may be variably configured to perform testing upon at least one of several different types of telecommunication service installations. Such a telecommunication test system would allow service providers to leverage their portable computer investment with portable-computer-based telecommunication test equipment.

SUMMARY OF THE INVENTION

A modular telecommunication test system is presented including a computer system and a telecommunication test module located external to the computer system. The telecommunication test module may be selected from a group of telecommunication test modules. Each member of the group of telecommunication test modules may be configured to perform a telecommunication test upon a different type of telecommunication service installation. Eligible types of telecommunication service installations may include, for example, POTS, T1/E1, ISDN, and xDSL.

The computer system may weigh less than 10 pounds and include a battery power supply. Each member of the group of telecommunication test modules may weigh less than 5 pounds and include a battery power supply. The variably configured modular telecommunication test system may thus be considered portable. The computer system may store software programs including a telecommunication test application. The telecommunication test application may include software instructions and data for performing a desired telecommunication test (i.e., one or more electrical measurements made upon a telecommunication service installation under test). The telecommunication test module is adapted for coupling to the computer system via a communication port including an electrical connector, and includes electrical circuitry for performing the desired telecommunication test. In order to configure the modular telecommunication test system for performing the desired telecommunication test, a user selects a telecommunication test module and couples the telecommunication test module to the computer system. The user may also select a telecommunication test application software program associated with the telecommunication test module as part of the system configuration procedure.

The telecommunication test module may include electrical circuitry for performing a selected set of telecommunication tests upon a selected type of telecommunication service installation. Accordingly, each member of the group of candidate telecommunication test modules may include electrical circuitry for performing a selected set of telecommunication tests upon a different type of telecommunication service installation.

The telecommunication test module may also include at least one electrical connector for electrically connecting the telecommunication test module to the telecommunication service installation under test. After configuring the telecommunication test system for the desired telecommunication test as described above, the user connects the telecommunication test module to the telecommunication service installation under test using the electrical connector. The telecommunication test system may then be used to perform the telecommunication test.

The computer system includes a central processing unit (CPU) which executes the instructions of the telecommunication test application during use. While executing the telecommunication test application, the computer system may produce one or more commands which are provided to the telecommunication test module. The telecommunication test module performs the telecommunication test in response to the received commands. The telecommunication test module may receive the commands prior to performing the telecommunication test, and may perform the telecommunication test autonomous to the computer system.

While performing the telecommunication test, the telecommunication test module acquires telecommunication test data. The telecommunication test module may provide the telecommunication test data to the computer system during the telecommunication test or following completion of the telecommunication test.

In one embodiment, the modular telecommunication test system includes a first computer system, a communication hub adapted for coupling to the first computer system, and a first and second telecommunication test modules located external to the first computer system. The first computer system stores the telecommunication test application, and may weigh less than 10 pounds and include a battery power supply. The communication hub provides communication between the first computer system and the first and second telecommunication test modules.

The first and second telecommunication test modules may be selected from a group of telecommunication test modules. Each member of the group of telecommunication test modules may include electrical circuitry for performing a set of telecommunication tests upon a different type of telecommunication service installation. Eligible types of telecommunication service installations may include, for example, POTS, T1/E1, ISDN, and xDSL. The telecommunication test system may thus be variably configured to perform testing upon two or more different types of telecommunication service installations. Each member of the group of telecommunication test modules may weigh less than 5 pounds and include a battery power supply, and may thus be considered portable.

The first telecommunication test module may include electrical circuitry for performing a first set of telecommunication tests upon a first type of telecommunication service installation. The first telecommunication test module may also include a first communication port adapted for coupling to the communication hub. The first communication port may be an RS-232 serial port including an electrical connector.

In order to configure the modular telecommunication test system for performing the first set of telecommunication tests, the user may couple a first RS-232 serial port of the communication hub to an RS-232 serial port of the first computer system. The user may then couple the electrical connector of the RS-232 serial port of the first telecommunication test module to a second RS-232 serial port of the communication hub. This action places the first telecommunication test module in serial communication with the first computer system via the communication hub.

The second telecommunication test module may include electrical circuitry for performing a second set of telecommunication tests upon a second type of telecommunication service installation. The second type of telecommunication service installation may be different from the first type. The second telecommunication test module may also include a second communication port adapted for coupling to the communication hub. The second communication port may be an RS-232 serial port including an electrical connector.

When the telecommunication test system has been configured for performing the first set of telecommunication tests as described above, the user may configure the system for performing the second set of telecommunication tests by coupling the electrical connector of the RS-232 serial port of the second telecommunication test module to a third RS-232 serial port of the computer hub. This action places the second telecommunication test module in serial communication with the first computer system via the communication hub.

The first computer system may include a CPU which executes instructions of the telecommunication test application during use. While executing the telecommunication test application, the computer system may produce commands. The first computer system may provide the commands to the communication hub, and the communication hub may provide the commands to both the first and second telecommunication test modules.

The first and second telecommunication test modules may be assigned different addresses. Each of the commands produced by the first computer system may include an address of a telecommunication test module coupled to the first computer system and forming a part of the telecommunication test system. When the first telecommunication test module receives a command including the address of the first telecommunication test module, the first telecommunication test module may perform one of the first set of telecommunication tests dependent upon the command. While performing the telecommunication test, the first telecommunication test module may acquire telecommunication test data. The first telecommunication test module may provide the telecommunication test data to the communication hub, and the communication hub may provide the telecommunication test data to the first computer system.

Similarly, when the second telecommunication test module receives a command including the address of the second telecommunication test module, the second telecommunication test module may perform one of the second set of telecommunication tests dependent upon the command. While performing the telecommunication test, the second telecommunication test module may acquire telecommunication test data. The second telecommunication test module may provide the telecommunication test data to the communication hub, and the communication hub may provide the telecommunication test data to the first computer system.

The first and second telecommunication test modules may include enclosures having stacking ports for connecting the first and second telecommunication test modules together. The user may attach disk-shaped stacking connectors between stacking ports on opposite sides of the first and second telecommunication test modules, thereby connecting the first and second telecommunication test modules together via the stacking ports.

The modular telecommunication test system may also include a second computer system coupled to the first computer system. When configured as described above, the first computer is coupled to receive telecommunication test data from the first and second telecommunication test modules (e.g., via the RS-232 serial port). The first computer system may be configured to provide the telecommunication test data to the second computer system. For example, the first and second computer systems may each include a communication device for coupling to a communication network. During use of the modular telecommunication test system, the second computer system may be coupled to the first computer system via the communication network, and the first computer system may provide the telecommunication test data to the second computer system via the communication network.

For example, the communication network may include the public switched telephone network (PSTN) and a separate wireless telephone or radio network each coupled to the Internet. The communication device of the first computer system may be coupled to communication network via the wireless telephone or radio network, and the communication device of the second computer system may be coupled to the communication network via the PSTN. The first and second computer systems may thus be coupled via the Internet, and the first computer system may provide the telecommunication test data to the second computer system via the Internet.

BRIEF DESCRIPTION OF THE DRAWINGS

FIG. 1a is a perspective view of one embodiment of a telecommunication test system including a portable computer system coupled to a telecommunication test module via a transmission medium;

FIG. 4 is a perspective view of two of the test modules of FIG. 3 connected together in a stacked arrangement;

FIG. 5a is a block diagram of one embodiment of a memory system of the portable computer system of FIGS. 1a and 1b, wherein the memory system includes a non-volatile portion, and wherein the non-volatile portion includes a hard disk drive having a non-removable storage medium, and wherein a telecommunication test application is stored upon the non-removable medium;

FIG. 5b is a block diagram of an alternate embodiment of the memory system of FIG. 5a, wherein the non-volatile portion of the memory system includes a drive and at least one removable storage medium adapted for inserting into the drive, and wherein the telecommunication test application is stored upon the at least one removable medium;

FIG. 8 is a block diagram of an alternate embodiment of the telecommunication test systems of FIGS. 1a and 1b, wherein the telecommunication test system includes a desktop computer system coupled to the portable computer system via a communication network;

DETAILED DESCRIPTION OF THE PREFERRED EMBODIMENT

Figure 1B:
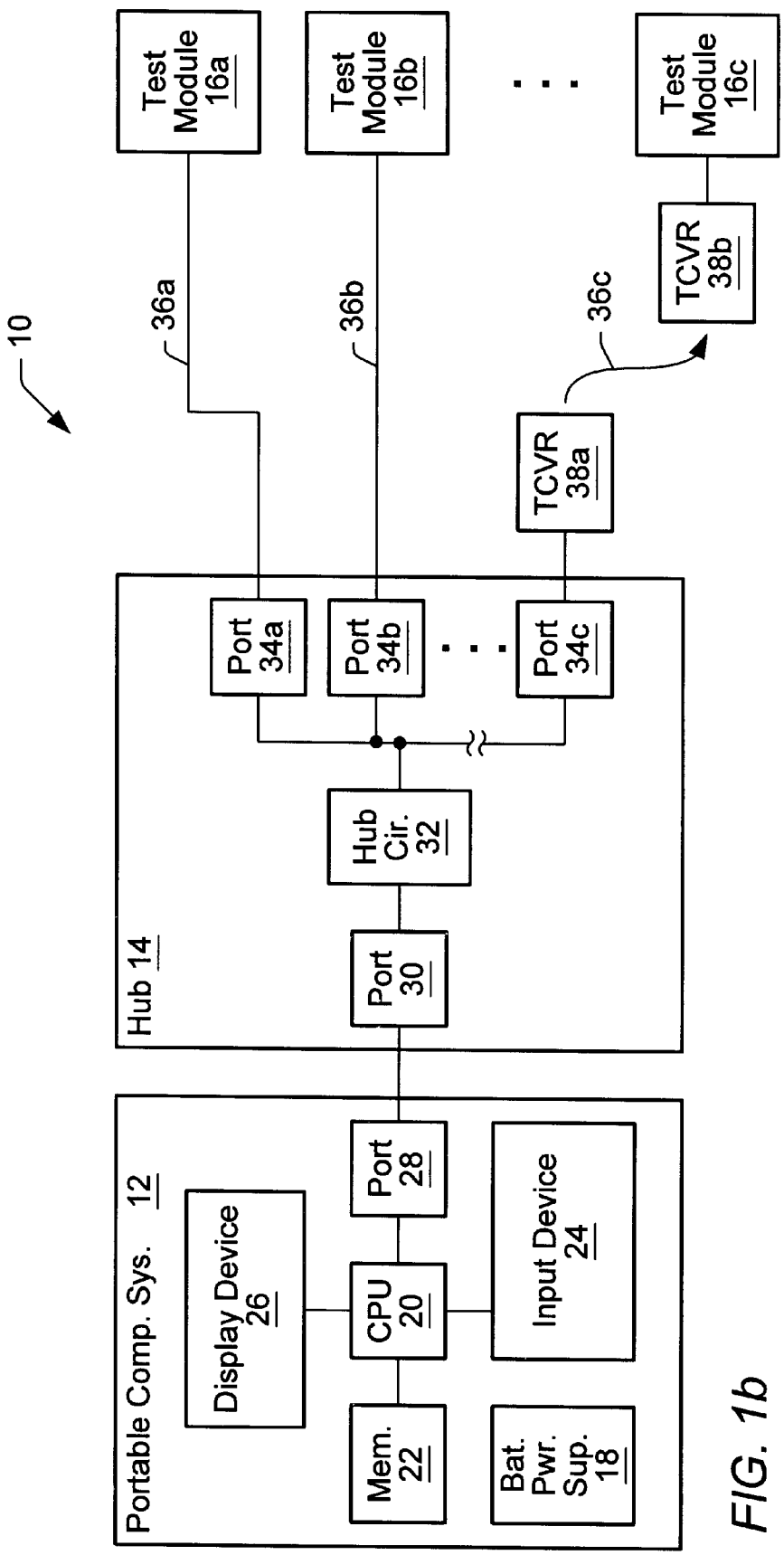
FIG. 1b is a block diagram of a second embodiment of the telecommunication test system of FIG. 1a wherein the portable computer system is coupled to multiple telecommunication test modules via a communication hub and transmission media.

FIG. 1a is a perspective view of one embodiment of a telecommunication test system 10. Telecommunication test system 10 includes a portable computer system 12 coupled to a telecommunication test module 16 via a transmission medium 36. FIG. 1b is a block diagram of a second embodiment of telecommunication test system 10, wherein portable computer system 12 is coupled to multiple telecommunication test modules 16a–c optimally via a communication hub 14 and transmission media 36a–c. In FIGS. 1a–b, each telecommunication test module 16 includes electrical circuitry required to perform a selected set of telecommunication test procedures relating to a specific type of telecommunication service installation. For example, test module 16a in FIG. 1b may perform selected telecommunication test procedures relating to POTS telecommunication service installations (e.g., a.c. and d.c. voltage, d.c. current, d.c. resistance, load coil detect, etc.) Test module 16b may perform selected telecommunication test procedures relating to T1/E1 telecommunication service installations, and test module 16c may perform selected telecommunication test procedures relating to ISDN telecommunication service installations. Other candidate types of telecommunication service installations include xDSL installations. A user selects the number and types of test modules 16 to be included in telecommunication test system 10 dependent upon the types of telecommunication service installations to be tested. Thus telecommunication test system 10 may include one or more telecommunication test modules 16. It is noted that when telecommunication test system 10 includes a single test module 16, communication hub 14 may not be necessary.

During operation of telecommunication test system 10, the user may connect input/output terminals of a test module 16 to selected electrically conductive portions of a telecommunication service installation under test. Portable computer system 12 may then issue one or more control signals or commands to the test module 16 optimally via communication hub 14. The control signals or commands may identify instructions stored within the test module 16 and associated with a user selected telecommunication test procedure. Alternately, the commands may themselves be instructions which are to be executed by the test module 16 in order to carry out the user selected telecommunication test procedure. The test module 16 may carry out the telecommunication test procedure and acquire resulting telecommunication test data. The test module 16 may provide the telecommunication test data to portable computer system 12 via communication hub 14. Portable computer system 12 may process and/or display the telecommunication test data.

Portable computer system 12 includes a battery power supply 18, preferably weighs less than about 10 pounds, and is small enough in size to be carried into the field by the user. Suitable types of portable computers include notebook computers, subnotebook computers, hand-held computers, palmtop computers (e.g., 3Com® Palm™ organizers), and personal digital assistants (PDAs).

In other embodiments, computer system 12 may be a non-portable computer system (e.g., a desktop computer system) which connects to one or more telecommunication test modules 16 by various means such as through wireless means or through the Internet.

In the embodiment of FIG. 1b, portable computer system 12 also includes a central processing unit (CPU) 20 coupled to a memory system 22, an input device 24, a display device 26, and a communication port 28. CPU 20 may be a processor which executes instructions of an instruction set. As will be described in more detail below, memory system 22 stores data items including instructions and data of a telecommunication test application. Display device 26 may be, for example, a liquid crystal display (LCD) flat panel display. Input device 24 may be, for example, a keyboard. Alternately, a surface of display device 26 may be modified to detect the touch of the user's finger or a stylus, and input device 24 may be the touch sensitive input portion of display device 26. Further, portable computer system 12 may be adapted for speech recognition, and input device 24 may be a microphone.

Communication port 28 may be a serial port for transmitting and receiving digital data one binary digit at a time. Communication port 28 may be, for example, an RS-232 port, an RS-422 port, an RS-485 port, a universal serial bus (USB) port, or an IEEE 1394 port, among others. In other words, communication port 28 may comply with the respective RS-232, RS-422, RS-485, USB, or IEEE 1394 standard. Communication port 28 may also be a parallel port, a network port, or other type of input/output (I/O) port.

Communication hub 14 includes a communication port 30 coupled to communication port 28 of portable computer system 12, hub circuitry 32, and communication ports 34a–c coupled to respective test modules 16a–c. As described above, hub 14 couples multiple test modules 16a–c to portable computer system 12. Accordingly, hub 14 has at least two communication ports 34, and may not be needed when a single test module 16 is to be coupled to portable computer system 12. Hub circuitry 32 receives data from communication port 28 of portable computer system 12 via communication port 30 and transmits the data to all test modules 16 via communication ports 34. Hub circuitry 32 also receives data from test modules 16 via respective communication ports 34 and transmits the data to communication port 28 of portable computer system 12 via communication port 30. When multiple test modules 16 transmit data simultaneously, hub circuitry 32 may temporarily store the data received from all but one of the test modules 16, then transmit the stored data to communication port 28 of portable computer system 12 in a sequential manner. Hub 14 may receive electrical power from portable computer system 12 via communication port 30, from one or more of the test modules 16, or may include a separate battery power supply.

Hub 14 is coupled to test modules 16a and 16b via respective transmission media 36a–b. Transmission media 36a–b may be separate electrical cables, each including multiple wires. Applicants note that if telecommunication test system 10 uses communication ports complying with the RS-232 standard, transmission media 36a–b may each include a reference ground wire and as few as four signal wires. The reference ground wire may be an electrically conductive shield surrounding the four signal wires in order to reduce the coupling of electrical noise into the signal wires.

In the embodiment of FIG. 1b, hub 14 is in wireless communication with test module 16c via transmission medium 36c. A first wireless transceiver (TCVR) 38a is coupled to communication port 34c of hub 14, and a second wireless transceiver (TCVR) 38b is coupled to a communication port of test module 16c. Wireless transceiver 38a and wireless transceiver 38b exchange signals (i.e., communicate) via transmission medium 36c. Transmission medium 36c may be, for example, light waves (e.g., infrared radiation) or radio waves travelling through air. For example, wireless transceiver 38a may produce a first infrared radiation (IR) signal dependent upon data received from communication port 34c of hub 14. Wireless transceiver 38b may receive the first IR signal, reproduce the data from the IR signal, and provide the data to the communication port of test module 16c. Similarly, wireless transceiver 38b may produce a second IR signal dependent upon data received from the communication port of test module 16c. Wireless transceiver 38a may receive the second IR signal, reproduce the data from the IR signal, and provide the data to communication port 34c of hub 14.

Each test module 16 of telecommunication test system 10 may be assigned a different address, and portable computer system 12 may communicate with a selected test module 16 by using a message format include the address of the selected test module 16. The commands produced by portable computer system 12 may include the address of an intended receiving test module 16.

Telecommunication test system 10 may also support "hot plugging", allowing modules 16 to be coupled to hub 14 via a transmission medium 36 (i.e., added to telecommunication test system 10) or decoupled from hub 14 (i.e., removed from telecommunication test system 10) while electrical power is being supplied to system components and without the need for reinitializing telecommunication test system 10. Portable computer system 12 may periodically poll addresses assigned to all of the different types of modules 16 in order to detect new modules 16 added to telecommunication test system 10. Portable computer system 12 may detect the removal of a test module 16 from telecommunication test system 10 by failure to receive an expected response from the test module 16. For example, the test module 16 may fail to generate an expected communication handshaking signal, or may fail to respond during the periodic polling.

Figure 2:
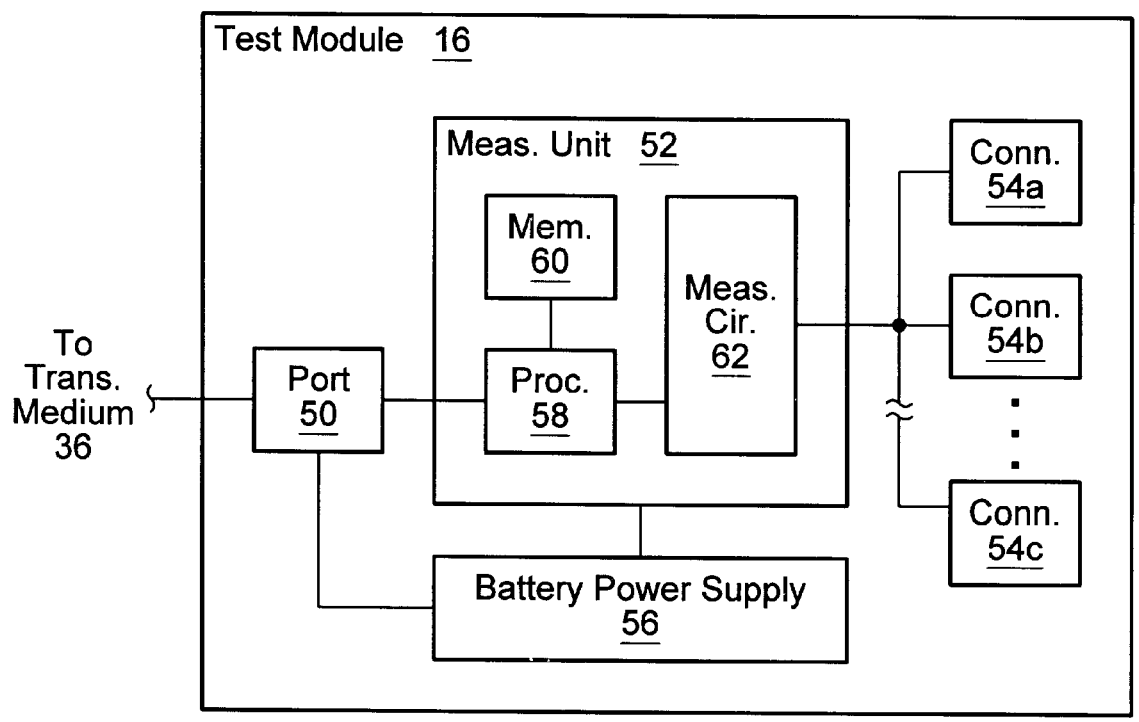
FIG. 2 is a block diagram of one embodiment of a representative one of the test modules of FIGS. 1a and 1b.

FIG. 2 is a block diagram of one embodiment of a representative one of the test modules 16 of FIGS. 1a and 1b. In the embodiment of FIG. 2, the test module 16 includes a measurement unit 52 coupled between a communication port 50 and electrical connectors 54a–c. Measurement unit 52 includes a processor and/or circuitry for carrying out a selected set of telecommunication test procedures relating to a specific type of telecommunication service installation (e.g., POTS, T1/E1, ISDN, xDSL, etc.). Communication port 50 is coupled to the transmission medium 36 associated with test module 16, and allows test module 16 to communicate with portable computer system 12. Electrical connectors 54a–c are for connecting to electrically conductive portions of a telecommunication service installation under test.

During use of test module 16, the user may connect one or more of the electrical connectors 54a–c to selected electrically conductive portions of the telecommunication service installation under test. Measurement unit 52 may then receive control signals or commands from portable computer system 12 via hub 14, transmission medium 36, and communication port 50. As described above, the control signals or commands may identify instructions stored within test module 16 and associated with a user selected telecommunication test procedure, or may themselves be the instructions.

Measurement unit 52 may carry out the steps of the telecommunication test procedure and acquire resulting telecommunication test data. For example, measurement unit 52 may apply test signals to the telecommunication service installation under test via one or more of the connectors 54a–c. The telecommunication service installation may respond by producing response signals. Measurement unit 52 may receive the response signals from the telecommunication service installation under test via one or more of the connectors 54a–c. Measurement unit 52 may sample the response signals, resulting in telecommunication test data. Measurement unit 52 may provide the telecommunication test data to portable computer system 12 via communication port 50, transmission medium 36, and hub 14.

Test module 16 also includes a battery power supply 56 coupled to measurement unit 52 and to communication port 50. Battery power supply 56 supplies the electrical power required by measurement unit 52 to carry out telecommunication test procedures and the electrical power required by communication port 50 to maintain communication with portable computer system 12. Battery power supply 56 preferably has enough electrical capacity to allow the components of test module 16 to operate in a normal fashion for between 24 and 48 hours.

In the embodiment of FIG. 2, measurement unit 52 includes a processor 58 coupled to a memory system 60 and measurement circuitry 62. Processor 58 may comprise a CPU, a DSP, an FPGA, etc. Processor 58 executes instructions of an instruction set. The instructions may be stored in memory system 60 and/or received from computer system 12. Memory system 60 stores data items, including instructions executed by processor 58. Measurement circuitry 62 includes electrical components required to carry out the selected set of telecommunication test procedures. Measurement circuitry 62 may include, for example, d.c.-to-d.c. voltage converters, a.c. signal generators, current sources, analog-to-digital and digital-to-analog converters, signal sampling circuitry, etc.

Memory system 60 may include a volatile portion and/or a non-volatile portion. The volatile portion may include, for example, static random access memory (SRAM) which requires an uninterrupted supply of electrical power in order to maintain stored contents. The non-volatile portion may include, for example, flash memory or electrically erasable programmable random access memory (EEPROM) which maintains stored contents even in the absence of applied electrical power.

Processor 58 is coupled to communication port 50, and controls the communication activities of communication port 50. For example, processor 58 may execute communication instructions stored within memory system 60 which implement a selected communication protocol. Telecommunication test module 16 may thus communicate with portable computer system 12 using the selected communication protocol.

POTS Test Module

When test module 16 is configured to perform tests on POTS telecommunication service installations, test module 16 may perform media testing and/or transmission testing. Media testing is primarily concerned with the electrical characteristics of a twisted pair of wires forming the local loop. Transmission Testing is primarily concerned with the characteristics of the POTS electrical signals upon the twisted pair. Measurement unit 52 may perform some or all of the following common POTS measurements: a.c. and d.c. voltage, d.c. current, d.c. resistance, load coil detect, open detect (capacitance), tone generation/attenuation (200 Hz to 20 kHz), noise, longitudinal balance, resistance to fault locate (RFL, Wheatstone bridge), and DTMF encode/decode. Measurement unit 52 may also perform some or all of the following POTS measurements: time domain reflectometer (TDR), caller ID ringer (telephone sets) detect, and pulse dial encode/decode. In addition, measurement system 52 may also provide "butt set" operation (i.e., operate as a field telephone set), and may also perform spectrum analysis data logging trend analysis.

Specifications for POTS Test Module

Test module 16 configured to perform POTS tests may perform to the following specification. Specification parameters are presented as: <Parameter Range>, <Resolution>, <Accuracy>.

AC/DC Voltage 0 to 99.9 V 0.1 V 1%+/−0.5 V 100 to 300 V 1 V 3V

DC Current (through internal 430 Ohm resistor) 0 to 100 mA 0.1 mA 1%+/−0.3 mA

Resistance (source voltage approximately 100 Vdc. Works even if resistance is in series with external source of up to +/−50 Vdc)

| 0 to 9999 Ohms | 1 Ohm | 1% +/− 5 Ohm |
| 10K to 99.9 kOhms | 0.1 KOhm | 1% |
| 100K to 999 kOhm | 1 KOhm | 3% |
| 1M to 9.9 MOhm | 0.1 MOhm | 3% |
| 10M to 99 MOhm | 1 MOhm | 5% |

Opens (based on cable capacitance—approximately 0.082 uF/mile; works with up to 2 Vrms AC noise)

| 0 to 3000 ft | 1 ft (1 m) | 1% +/− 3 ft |
| 3000 to 10000 ft | 5 ft | 3% |
| 10000 to 20000 ft | 10 ft | 5% |

NOTE: Shows "distances" as feet, meters, and/or capacitance

RFL (bridge measurement—approximately 100 Vdc source. Must work with external AC/DC noise source in series with Fault resistance. Note: need to show resistance and distance (in feet or meters) to fault; approximately 40 ft/Ohm for common wire gauges.)

| Res. Fault (Rf) | | |
|---|---|---|
| | 0 to 5 MOhm | — |
| Resistance to Fault | | |
| | 0 to 99.99 Ohms | 0.01 Ohms 0.1% |
| of RTS | | +/− 0.01 Ohm |
| | 1000 to 999 Ohms | 0.1 Ohms 0.1% |
| of RTS | | |

(RTS: "Resistance to Strap"—the resistance to the end of the cable.

Loss/Frequency (NOTE: 0 dbM=1 mWatt across 600 Ohm terminating resistance)

| | −40 to +10 dBm, | 1 dB | 0.5 dB |
|---|---|---|---|
| | 200 to 4000 Hz | 1 Hz | 1 Hz |
| | 4000 to 20000 Hz | 1 Hz | 10 Hz |
| Noise Metallic | 0 to 50 dBrnc | 1 dB | 2 dB |
| | −90 to −40 dBm0p | 1 dB | 2 dB |
| Noise to Ground | 40 to 100 dBrnc | 1 dB | 2 dB |
| | −50 to 10 dBm0p | 1 dB | 2 dB |

(NOTE: 0 dBrnC=−90 dBm with Cmessage filter; dBm0p=0 dBm with Psophometric filter)

Longitudinal Balance (selectable 800 or 1000 Hz source; this measures a ratio of AC currents between (Tip/Ground) and (Ring/Ground)—details to follow.)

"ID" Tone Output (sine wave interrupted at 2 Hz—used for cable Identification with small receiver)

| 200 to 1000 Hz, | 1 Hz | 1% |
|---|---|---|

+10 dBm (or as high as possible—accuracy not

| Tone (solid sine wave) | | |
|---|---|---|
| 200 to 9999 Hz, | 1 Hz | 1% |
| −20 to +1 dBm | 1 dB | 1 dB |
| 10k to 20 kHz, | 1 Hz | 2% |
| −20 to +1 dBm | 1 dB | 1 dB |
| Dial DTMF | TBD | TBD |

TDR (+/−20 Vpeak half-sine wave, 100 Ohm source impedance)

| Ranges: | | |
|---|---|---|
| 3–300 ft | 1 ft | 0.6% range |
| 20–1000 ft | 1 ft | 0.6% range |
| 50–3000 ft | 1 ft | 0.6% range |
| 150–10000 ft | 1 ft | 0.6% range |

Pulse width (defined as 3 dB down point from max half-sine wave): 5 ns, 50 ns, 500 ns.

| velocity factor input | | 0.50 to 0.990.01 |
|---|---|---|
| zoom | x1, x2, x4, x8, x16 | fixed values |
| vertical gain | x1, x2, x4, x8, x16 | fixed values |
| Load Coil Count | 0 to 4    1 | 1 |

ISDN Test Module

When test module 16 is configured to perform tests on ISDN telecommunication service installations, test module 16 may perform functional level tests. If the ISDN service installation under test performs all the basic functions required of the ISDN protocol standards, the service, including the cable network, may be considered to be working properly. Test module 16 may perform the following common ISDN-related functions: verify new customer ISDN service activation, verify quality data and voice service at customer site, verify line quality and bandwidth (via bit error rate test), troubleshoot and simulate terminal adapters as TE or NT1/TE combination, perform ISDN protocol analysis view, and record interaction between the ISDN tester and the central office.

Specific Functions of ISDN Test Module

Figure 3:
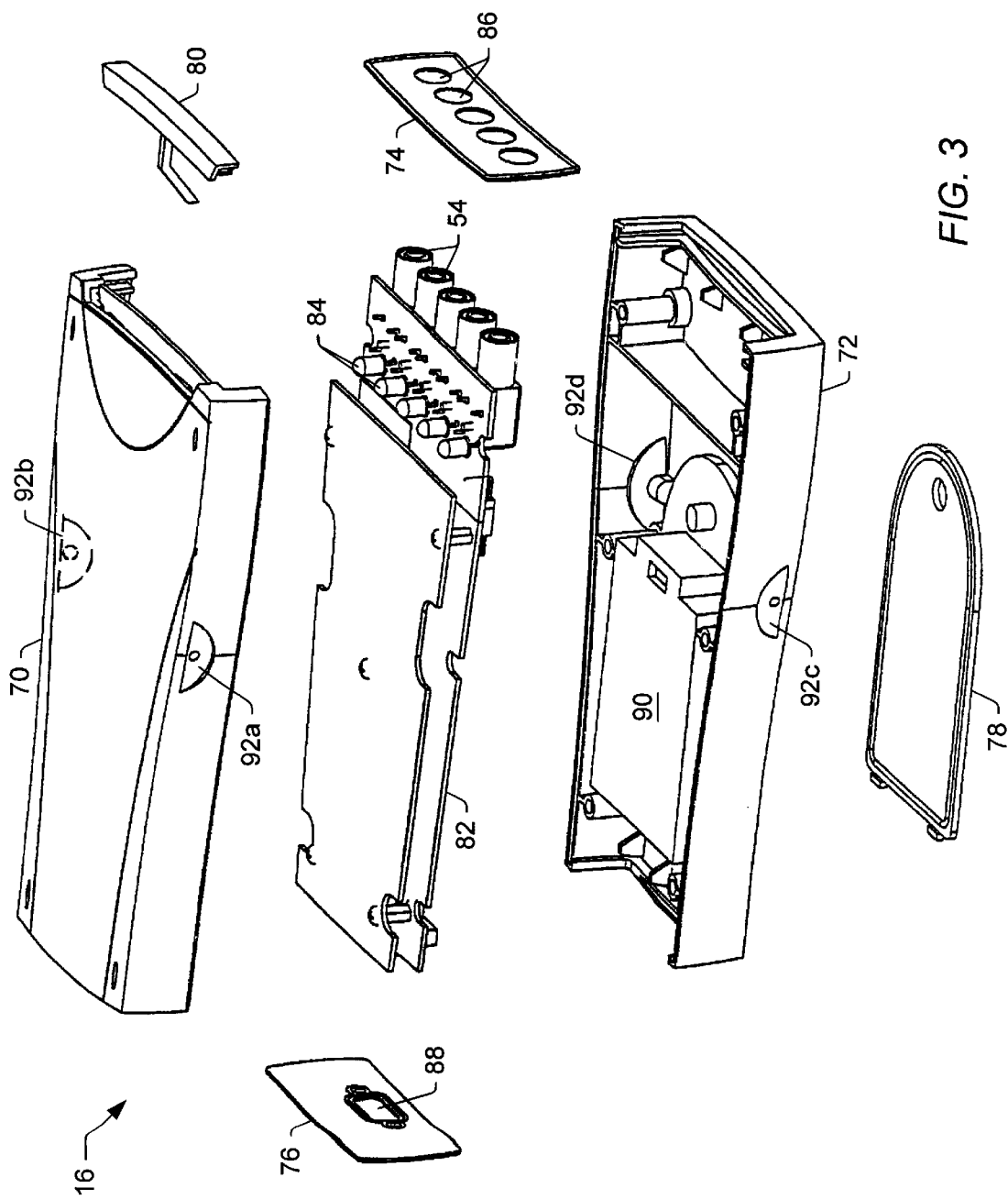
FIG. 3 is a perspective view of one embodiment of the test module of FIG. 2 showing the components of the test module separated from one another.

Test module 16 configured to perform ISDN tests may perform to the following functions:
  Automated test sequencer
    The user can create custom test sequences
    Complete report of all tests generated on each run
    Fully automated test execution for complete coverage every time
  Access at either the 2-wire 2B1Q U interface or the 4-wire S/T interface
  Support for many popular ISDN variations
    EuroISDN/ISDN2E
    National ISDN-1
    AT&T Custom
    Northern Telecom DMS
    British (ISDN2), French (VN3), and German deltas
  Transmission quality measurement
    End-to-end loop back or self-call
    Single channel or two channel bit error rate testing (BERT)
    Pre-defined random bit patterns (PRN9, 11, 15)
    Complete G.821 results display
  Speech/3.1 kHz testing using computer speakers/microphone or a headset
  D channel message decode
  Simulates terminal adapters at U and S/T interfaces
  Analysis of call services
    Voice, audio, data
    Telephony
    Fax
    video
  Testing of supplementary services
    Calling Line Identity Presentation (CLIP)/Calling Line Identity Restriction (CLIR)
    Direct Dialing In (DDI)/Multiple Subscriber Numbers (MSN)
    Sub-address
  Full analysis, decode, and logging of signaling messages
    Layer 2 (LAPD) frames
    Layer 3 (Q.931) call control messages and information elements
    Tele-power supply voltage measurement, including detection of normal and restricted power conditions FIG. 3 is a perspective view of one embodiment of test module 16 of FIG. 2 showing the components of test module 16 separated from one another. In the embodiment of FIG. 3, test module 16 includes a top cover 70, a bottom cover 72, a front panel 74, a rear panel 76, a battery cover 78, a lens 80, and a circuit board 82. Top cover 70, bottom cover 72, front panel 74, rear panel 76, battery cover 78, and lens 80 come together to form a protective case or enclosure around circuit board 82. The enclosure protects circuit board 82 from physical impact, mechanical shock, and splashing water (e.g., rain). Referring back to FIG. 2, communication port 50 and measurement unit 52 are formed upon one or more surfaces of circuit board 82. Connectors 54 are mounted to circuit board 82 as shown in FIG. 3, as are light emitting diodes (LEDs) 84. Lens 80 makes LEDs 84 visible through the protective enclosure. Measurement unit 52 illuminates LEDs 84 to inform the user of the status of test module 16. Front surfaces of connectors 54 protrude from the enclosure through holes 86 in front panel 74. An electrical connector of communication port 50 may protrude from the enclosure through a hole 88 in rear panel 76. A battery compartment 90 in bottom cover 72 houses one or more batteries of battery power supply 56.

Top cover 70 includes a first stacking port 92a on one side, and a second stacking port 92b on an opposite side. Bottom cover 72 includes a first stacking port 92c on one side, and a second stacking port 92d on an opposite side. Stacking ports 92a–d are used to connect multiple test modules 16 together as will be described in more detail below.

The enclosure preferably has a length of about 6 inches (15 centimeters or cm.) from front panel 74 to rear panel 76, a width of about 4 inches (10 cm.) from one side of the enclosure to an opposite side, and a height of about 2 inches (5 cm.) from a top surface of top cover 70 to a bottom surface of bottom cover 72 when top cover 70 and bottom cover 72 are brought together to form the enclosure. Having these dimensions and weighing less than about 5 pounds, individual test modules 16 may be easily carried.

In the embodiment of FIG. 3, connectors 54 make up a row of five banana connectors mounted side by side. Other useful combinations of connectors 54 include two RJ45 connector and/or an RJ11 connector mounted side by side, four bantam jacks mounted side by side, and a combination of three BNC connectors mounted side by side and two SMB connectors stacked vertically on top of one another. A removable weatherproof cover may be placed over connectors 54 to further prevent moisture from entering the enclosure through connectors 54 and/or small openings between front panel 74 and connectors 54.

The enclosure may also provide EMI shielding for electrical components of test module 16. If the enclosure is made of plastic, an electrically conductive coating may be applied to surfaces of the enclosure components. Alternate to the use of the electrically conductive coating, or in addition to the electrically conductive coating, a sheet metal box may be incorporated into test module 16 which surrounds circuit board 82.

FIG. 4 is a perspective view of two test modules 16a and 16b connected together in a stacked arrangement. In FIG. 4, a first disk-shaped stacking connector 94a is attached between stacking port 92d of test module 16a and stacking port 92b of test module 16b. Similarly, a second disk-shaped stacking connector 94b is attached between stacking port 92c of test module 16a and stacking port 92a of test module 16b. Stacking connectors 94a–b thus join test modules 16a–b together via stacking ports 92c–d of test module 16a and stacking ports 92a–b of test module 16b. It is noted the stacking ports 92a–b of test module 16a remain available for connecting another test module to test module 16a, and stacking ports 92c–d of test module 16b remain available for connecting another test module to test module 16b.

FIG. 4 also serves to illustrate an embodiment of test module 16 wherein two cables exit rear panel 76 through hole 88 (FIG. 3). Test module 16a has a connector 96a at an end of a first cable, and a connector 98b at an end of a second cable. Connector 96a may be coupled to battery power supply 56 (FIG. 2) of test module 16a. During use of telecommunication test system 10, the user may couple connector 96a to battery power supply 18 of portable computer system 12 (FIG. 1b), possibly through communication hub 14. When connector 96a is coupled to battery power supply 18 as described, battery power supply 56 of test module 16a may supply electrical power to portable computer system 12, thus augmenting battery power supply 18 of portable computer system 12. Connector 96b of test module 16b may function similarly. Battery power supply 56 of test module 16a may also supply electrical power to communication hub 14. Connector 98a may be coupled to and/or be a part of communication port 50. During use of telecommunication test system 10, connector 98a may be coupled to communication port 28 of portable computer system 12, possibly through communication hub 14, as described above in order to establish communication between test module 16a and portable computer system 12. Connector 98b of test module 16b may function in a similar manner.

Portable Computer System Software

FIG. 5a is a block diagram of one embodiment of memory system 22 of portable computer system 12. In the embodiment of FIG. 5a, memory system 22 includes a volatile portion 100 and a non-volatile portion 102. Volatile portion 100 may include, for example, static random access memory (SRAM) which requires an uninterrupted supply of electrical power in order to maintain stored contents.

Non-volatile portion 102 includes a hard disk drive (HDD) 104. Hard disk drive 104 includes a non-removable storage medium 106 for storing data items (e.g., a magnetic disk). Non-removable medium 106 has a telecommunication test application (TTA) 108 stored thereupon. Telecommunication test application 108 includes instructions and data required to carry out telecommunication test procedures as explained in more detail below.

FIG. 5b is a block diagram of an alternate embodiment of memory system 22, wherein non-volatile portion 102 includes a drive 110 and at least one removable storage medium 112 adapted for inserting into drive 110. The at least one removable medium 112 has telecommunication test application 108 stored thereupon.

As is well known, at least a portion of telecommunication test application 108 may be copied from non-volatile portion 102 of memory system 22 to volatile portion 100 during operation of telecommunication test system 10. CPU 20 of portable computer system may fetch the instructions and data of telecommunication test application 108 from volatile portion 100 during operation of telecommunication test system 10, thus executing telecommunication test application 108 during operation of telecommunication test system 10.

Figure 6:
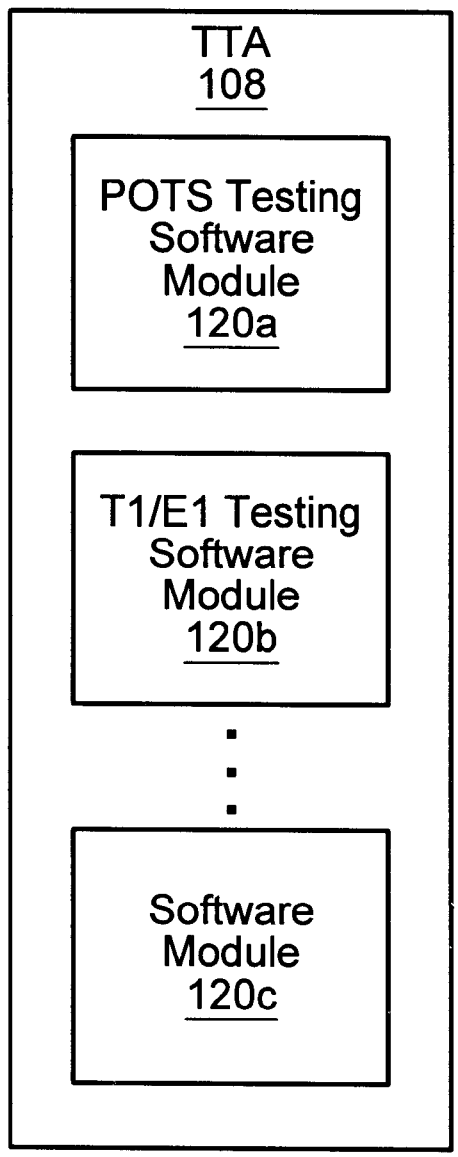
FIG. 6 is a block diagram of one embodiment of the telecommunication test application of FIGS. 5a–b, wherein the telecommunication test application includes multiple software modules, and wherein each software module is associated with a different test module and includes all of the instructions and data needed to carry out a selected set of telecommunication test procedures associated with the test module.

FIG. 6 is a block diagram of one embodiment of telecommunication test application 108. In the embodiment of FIG. 6, telecommunication test application 108 includes software modules 120a–c. Each software module 120 is associated with a different test module 16 which may be coupled to hub 14, and includes software instructions and data for carrying out the selected telecommunication test procedures associated with the test module 16. For example, software module 120a may be associated with test module 16a coupled to hub 14 as shown in FIG. 1b. Test module 16a may include hardware necessary to carry out a selected set of POTS telecommunication test procedures. Software module 120a may include the instructions and data required to carry out the selected set of POTS telecommunication test procedures. Similarly, software modules 120b and 120c may be associated with respective test modules 16b and 16c coupled to hub 14 as shown in FIG. 1b. Test module 16b may include hardware necessary to carry out a selected set of T1/E1 telecommunication test procedures, and test module 16c may include hardware necessary to carry out a selected set of ISDN telecommunication test procedures. Software module 120b may include the instructions and data required to carry out the selected set of T1/E1 telecommunication test procedures, and software module 120c may include the instructions and data required to carry out the selected set of ISDN telecommunication test procedures.

Each of the software modules 120 may operate autonomously, and may be activated only when the associated test module is coupled to hub 14. For example, during the periodic polling described above, CPU 20 may detect a new test module 16 added to telecommunication test system 10. In response, CPU 20 may activate the software module 120 associated with the newly added test module 16. CPU 20 may also display a graphical symbol upon display device 26 representing the newly added telecommunication test capabilities embodied within the added test module 16 and the activated software module associated with the added test module 16. Similarly, CPU 20 may detect a test module 16 removed from telecommunication test system 10 as described above. In response, CPU 20 may deactivate the software module 120 associated with the removed test module 16. CPU 20 may also cease to display the graphical symbol upon display device 26 associated with the removed test module 16 and deactivated software module 120.

Figure 7:
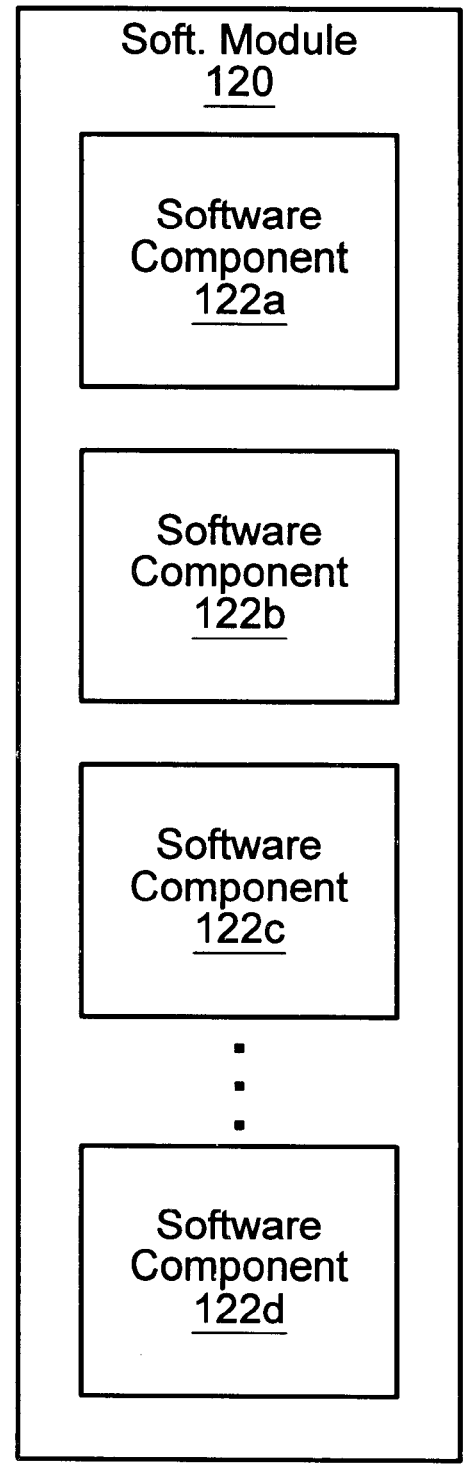
FIG. 7 is a block diagram of one embodiment of a representative one of the software modules of FIG. 6, wherein the software module includes multiple software components, and wherein each software component includes instructions and data used to carry out one or more closely related telecommunication test procedures of the selected set of telecommunication test procedures.

FIG. 7 is a block diagram of one embodiment of a representative one of the software modules 120 shown in FIG. 6. Software module 120 includes all of the instructions and data needed to carry out the selected set of telecommunication test procedures associated with a given test module 16 and relating to a specific type of telecommunication service installation. Software module 120 includes software components 122a–d. Each software component 122 includes instructions and data used to carry out one or more closely related telecommunication test procedures of the selected set of telecommunication test procedures. Each software component 122 may also include instructions and data of a "measurement advisor" used to guide a user through the one or more closely related telecommunication test procedures of the software component 122. In combination, software components 122a–d include all of the instructions and data needed to carry out the selected set of telecommunication test procedures associated with the given test module 16.

For example, software module 120 may be associated with test module 16a coupled to hub 14 as shown in FIG. 1b. Test module 16a may include hardware necessary to carry out a selected set of POTS telecommunication test procedures including a.c. and d.c. voltage measurements, d.c. current and resistance measurements, load coil detect measurements, open detect (capacitance) measurements, noise measurements, longitudinal balance measurements, resistance to fault locate (RFL) measurements, and TDR measurements. The a.c. and d.c. voltage and d.c. current and resistance measurements are generally placed within a digital multimeter (DMM) measurements category, and are thus considered closely related. Software component 122a may include instructions and data required to carry out the a.c. and d.c. voltage measurements and the d.c. current and resistance measurements, along with other DMM measurements.

The load coil detect, open detect (capacitance), and RFL measurements generally belong to a fault location measurements category, and are thus considered closely related. Software component 122b may include instructions and data required to carry out the load coil detect, open detect (capacitance), and RFL measurements, along with other fault location measurements.

It is noted that telecommunication test procedures such as load coil detect measurements require fast Fourier transforms (FFTs). It is therefore preferable that CPU 20 or portable computer system 12 support either hardware floating point processing or at the least software floating point emulation.

The noise and longitudinal balance measurements generally belong to a cable noise and balance measurements category, and are thus considered closely related. Software component 122c may include instructions and data required to carry out the noise and longitudinal balance measurements, along with other cable noise and balance measurements.

The TDR measurements are generally placed in a category all by themselves. Software component 122d may include instructions and data required to carry out the TDR measurements. It is noted that software components 122a–d include all of the needed instructions and data needed to carry out selected set of telecommunication test procedures associated with POTS test module 16a and relating to the POTS type of telecommunication service installation.

In order to take advantage of the benefits of multiprocessing and/or multithreading, software components 122 of software modules 120 may be multithreaded (i.e., execute in multiple threads) and/or execute in multiple processes as is well known in the art.

Distributed Telecommunication Test System

FIG. 8 is a block diagram of an alternate embodiment of telecommunication test system 10, wherein telecommunication test system 10 includes a desktop computer system 124 coupled to portable computer system 12 via a communication network 126. In the embodiment of FIG. 8, desktop computer system 124 includes a communication device 128 coupled to communication network 126 via a transmission medium 130, and portable computer system 12 includes a communication device 132 coupled to communication network 126 via a transmission medium 134. Communication network 126 may be a computer network, communication device 128 and/or communication device 132 may be a communication port or card, and transmission media 130 and 134 may the same or separate sets of wires. Alternately, communication network 126 may include the public switched telephone network (PSTN), communication device 128 may be a modem, and transmission medium 130 may be a pair of wires coupling communication device 128 to the PSTN. Communication device 132 may be a wireless telephone or radio including a modem, and transmission medium 134 may be radio waves in air. Communication network 126 may convert the signals generated by communication device 132 to radio signals, thus placing communication device 128 in communication with communication device 132. Communication network 126 may couple wireless signals generated by communication device 132 to the PSTN, thus placing communication device 132 in communication with communication device 128.

In the embodiment of FIG. 8, desktop computer system 124 also includes a CPU 136 coupled to a memory system 138, an input device 140, and a display device 142. CPU 136 may be a processor which executes instructions of an instruction set. As will be described in more detail below, memory system 138 stores data items including instructions and data which allow desktop computer system 124 to communicate with portable computer system 12. Input device 140 may be, for example, a keyboard. Display device 142 may include a cathode ray tube.

Desktop Computer System Software

Figure 9A:
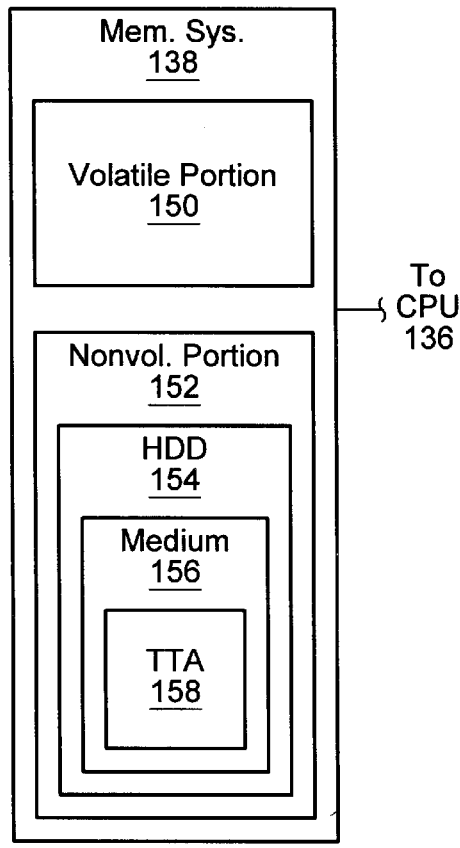
FIG. 9a is a block diagram of one embodiment of a memory system of the desktop computer system of FIG. 8, wherein the memory system includes a non-volatile portion, and wherein the non-volatile portion includes a hard disk drive having a non-removable storage medium, and wherein telecommunication test software is stored upon the non-removable medium.

FIG. 9a is a block diagram of one embodiment of memory system 138 of desktop computer system 124. In the embodiment of FIG. 9a, memory system 138 includes a volatile portion 150 and a non-volatile portion 152. Volatile portion 150 may include, for example, static random access memory (SRAM) which requires an uninterrupted supply of electrical power in order to maintain stored contents.

Non-volatile portion 152 includes a hard disk drive (HDD) 154. Hard disk drive 154 includes a non-removable medium 156 for storing data items (e.g., a magnetic disk). Non-removable storage medium 156 has telecommunication test software (TTS) 158 stored thereupon. Telecommunication test software 158 includes instructions and data as explained in more detail below.

Figure 9B:
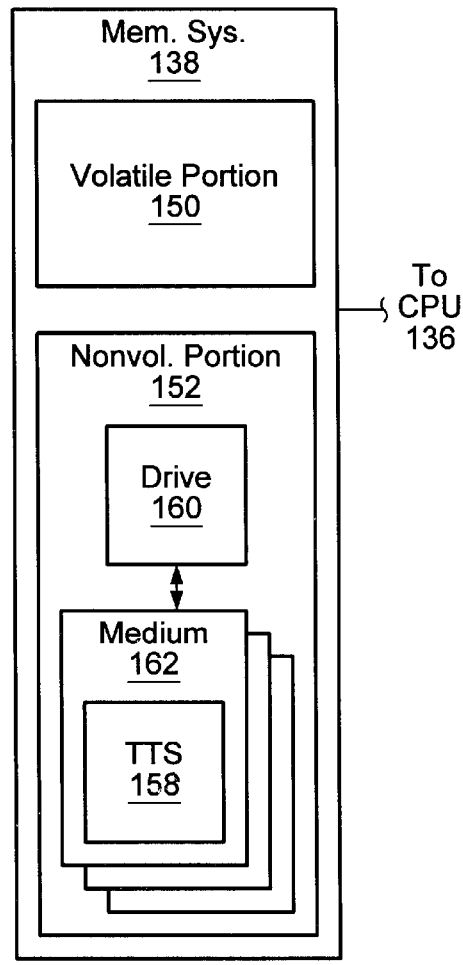
FIG. 9b is a block diagram of an alternate embodiment of the memory system of FIG. 9a, wherein the non-volatile portion of the memory system includes a drive and at least one removable storage medium adapted for inserting into the drive, and wherein the telecommunication test software is stored upon the at least one removable medium.

FIG. 9b is a block diagram of an alternate embodiment of memory system 138, wherein non-volatile portion 152 includes a drive 160 and at least one removable storage medium 162 adapted for inserting into drive 160. The at least one removable medium 162 has telecommunication test software 158 stored thereupon.

As is well known, at least a portion of telecommunication test software 158 may be copied from non-volatile portion 152 of memory system 138 to volatile portion 150 during operation of telecommunication test system 10. CPU 136 of desktop computer system 124 may fetch the instructions and data of telecommunication test software 158 from volatile portion 150 during operation of telecommunication test system 10, thus executing telecommunication test software 158 during operation of telecommunication test system 10.

Figure 10:
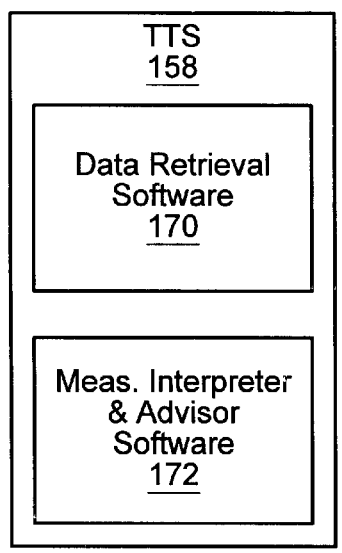
FIG. 10 is a block diagram of one embodiment of telecommunication test software of FIGS. 9a–b, wherein the telecommunication test software includes data retrieval software and measurement interpreter and advisor software.

FIG. 10 is a block diagram of one embodiment of telecommunication test software 158 of FIGS. 9a–b. In the embodiment of FIG. 10, telecommunication test software 158 includes data retrieval software 170 and "measurement interpreter and advisor" software 172. Data retrieval software 170 includes instructions and data which allow desktop computer system 124 to retrieve telecommunication test data from portable computer system 12. Measurement interpreter and advisor software 172 includes instructions and data for processing and analyzing telecommunication test data received from portable computer system 12. Measurement interpreter and advisor software 172 may also include instructions and data for guiding a user through telecommunication test procedures and/or complex troubleshooting procedures. Data retrieval software 170 and/or measurement interpreter and advisor software 172 may also include instructions and data for remotely controlling computer system 12 in order to perform telecommunication test procedures.

Internet Connectivity

In FIG. 8, communication network 126 may include the Internet (i.e., a global network connecting millions of computers), wherein the Internet may include a portion of the PSTN and/or a separate wireless telephone or radio network. Communication device 128 may be a modem or DSL adapter, and transmission medium 130 may be a pair of wires coupling communication device 128 to the PSTN and the Internet. Communication device 132 may be a wireless telephone or radio including a modem, and transmission medium 134 may be radio waves in air connecting communication device 132 to the wireless telephone or radio network and the Internet. Communication device 128 of desktop computer system 124 and communication device 132 of portable computer system 12 may thus be in communication with one another via the Internet.

The World Wide Web (or simply the "Web") is a system of Internet servers that support documents formatted in a hypertext language such as hypertext markup language (HTML). HTML supports links to other documents, graphics, audio, and video files. Software applications called Web browsers are used to locate and display Web pages. Well know Web browsers include Netscape® Navigator and Microsoft® Internet Explorer.

A Web server is a computer that delivers (i.e., "serves") Web pages. Each Web server has a unique uniform resource locator (URL). For example, if a user enters the URL "http://www.pcwebopedia.com/index.html" in a Web browser, the Web browser sends a request to the Web server with domain name "pcwebopedia.com". In response to the request, the Web server fetches the HTML page named "index.html" and sends it to the Web browser.

Modem computer programming languages allow programmers to add Internet access capability to applications. Examples of such programming languages include Microsoft® Visual Basic®, Visual C++®, and Visual J++®. Internet access capability is typically provided by inserting a Web browser engine into the application code.

Portable computer system 12 may include Web server software, thus portable computer system 12 may function as a Web server having a unique URL. A user of portable computer system 12 may execute one or more telecommunication test procedures of a software component 122 associated with a given test module 16, thereby generating telecommunication test data. Alternately, the software component 122 may be programmed to execute the one or more telecommunication test procedures periodically. The software component 122, or another software application running on portable computer system 12, may insert the telecommunication test data into a preformatted HTML page.

Data retrieval software 170 executed by CPU 136 of desktop computer system 124 may include Web browser software. Data retrieval software 170 may transmit a request for the preformatted HTML page including the URL of portable computer system 12 via communication device 128 and the Internet. Portable computer system 12 may receive the request via the Internet and communication device 132. In response to the request, portable computer system 12 may transmit the preformatted HTML page including the telecommunication test data to desktop computer system 124 via communication device 132 and the Internet.

Data retrieval software 170 of desktop computer system 124 may receive the HTML page from portable computer system 124 via the Internet and communication device 128, and may extract the telecommunication test data from the HTML page. Data retrieval software 170 may reformat and display the extracted telecommunication test data upon display device 142, save the extracted telecommunication test data within memory system 138, or provide the telecommunication test data to another software application currently running within desktop computer system 124 (e.g., measurement interpreter and advisor software 172, a database program, etc.).

In one embodiment, desktop computer system 124 includes DataSocket™ software (National Instruments Corp., Austin, Tex.) for accessing data from portable computer system 12 using URLs. For more information on accessing data using DataSocket™, please see U.S. patent application Ser. No. 09/185,161 entitled "Data Socket System and Method for Accessing Data Sources Using URLs."

Remote Testing Via Test Software Transfer and Execution

Various software transfer technologies are available today which allow a first computer system (e.g., a Web server) to transfer program software to a second computer (e.g., via the Internet) which will be executed by the second computer system upon receipt. Such software transfer technologies include Java applets and ActiveX® controls. Desktop computer system 124 may include Web server software and may function as a Web server. Portable computer system 12 may include Web browser software. A user of portable computer system 12 may cause portable computer system 12 to transmit a request for a preformatted HTML page. The preformatted HTML page may have test program software (e.g., in the form of a Java applet or an ActiveX® control) embedded therein.

In response to the received request from portable computer system 12, desktop computer system 124 may transmit the preformatted HTML page including the embedded test program software to portable computer system 12 (e.g., via the Internet). The Web browser software of portable computer system 12 may receive the HTML page including the embedded test program software and execute the test program software. The test program software may include instructions which cause one or more of the telecommunication test applications of a software component 122 residing within portable computer system 12 to be executed, thereby generating telecommunication test data. The software component 122, or another software application running on portable computer system 12, may transmit the telecommunication test data in HTML format to desktop computer system 124 (e.g., via the Internet).

ActiveX® is a set of software component technologies developed by the Microsoft Corporation (Microsoft) specifically for Web use. An ActiveX® control can be automatically downloaded and executed by a Web browser which supports ActiveX®. ActiveX® controls are commonly used in Web pages to add functionality and to greatly improve appearance. For example, ActiveX® controls are used to display moving images (e.g., waving flags and animated cartoons) and color-changing icons. While originally developed for x86-processor-based computer systems running the Microsoft® Windows® operating system, ActiveX® and other software component technologies developed by Microsoft are being ported to other operating systems. ActiveX®-compatible, automation-capable applications may be executed by ActiveX® controls. Common examples of ActiveX®-compatible, automation-capable applications include Microsoft® Excel and Microsoft® Word.

In an embodiment of telecommunication test system 10 which takes advantage of ActiveX® capabilities, data retrieval software 170 executed by CPU 136 of desktop computer system 124 may include Web server software, and desktop computer system 124 may function as a Web server having a unique URL. Portable computer system 12 may include Web browser software, and software modules 120 and software components 122 contained therein may be ActiveX®-compatible, automation-capable applications. A user of portable computer system 12 may cause portable computer system 12 to transmit a request for a preformatted HTML page including an ActiveX® control to the URL of desktop computer system 124 via communication device 132 and the Internet.

Desktop computer system 124 may receive the request via the Internet and communication device 128. In response to the request, desktop computer system 124 may transmit the preformatted HTML page including the ActiveX® control to portable computer system 12 via communication device 128 and the Internet. The Web browser software of portable computer system 12 may receive the HTML page including the ActiveX® control from desktop computer system 124 via the Internet and communication device 132.

The Web browser software running on portable computer system 12 may execute the ActiveX® control present within the received HTML page. The ActiveX® control may include instructions which cause one or more of the telecommunication test applications of a software component 122 residing within portable computer system 12 to be executed, thereby generating telecommunication test data. The software component 122, or another software application running on portable computer system 12, may transmit the telecommunication test data in HTML format to desktop computer system 124 via communication device 132 and the Internet.

Data retrieval software 170 of desktop computer system 124 may receive the HTML-formatted telecommunication test data from portable computer system 124 via the Internet and communication device 128, and may extract the telecommunication test data from the HTML formatting. Data retrieval software 170 may reformat and display the extracted telecommunication test data upon display device 142, save the extracted telecommunication test data within memory system 138, or provide the telecommunication test data to another software application currently running within desktop computer system 124 (e.g., measurement interpreter and advisor software 172, a database program, etc.).

What is claimed is:

1. A modular telecommunication test system, comprising:

a computer system, wherein the computer stores a telecommunication test application;

a telecommunication test module located external to the computer system, wherein the telecommunication test module includes electrical circuitry for performing a telecommunication test and a communication port for connecting to the computer system;

wherein the telecommunication test module is selected from a plurality of telecommunication test modules;

wherein the telecommunication test module is adapted for coupling to the computer system in order to configure the modular telecommunication test system for performing the telecommunication test;

wherein the telecommunication test module is operable to receive commands from the computer system in order to configure the telecommunication test module for performing the telecommunication test; and wherein the telecommunication test module performs the telecommunication test autonomous to the computer system.

2. The modular telecommunication test system of claim 1, wherein the telecommunication test module includes at least one connector for connecting to a telecommunication service installation.

3. The modular telecommunication test system of claim 2, wherein the telecommunication service installation is selected from the group consisting of POTS, T1/E1, ISDN, and xDSL.

4. The modular telecommunication test system of claim 3, wherein the telecommunication test module includes electrical circuitry for performing a selected set of telecommunication tests upon the selected telecommunication service installation.

5. The modular telecommunication test system of claim 4, wherein each of the plurality of telecommunication test modules includes electrical circuitry for performing a selected set of telecommunication tests upon a different type of telecommunication service installation selected from the group consisting of POTS, T1/E1, ISDN, and xDSL.

6. The modular telecommunication test system of claim 1, wherein the computer system produces at least one command while executing the telecommunication test application, and wherein the telecommunication test module receives the at least one command and performs the telecommunication test in response to the at least one command.

7. The modular telecommunication test system of claim 6, wherein the telecommunication test module receives the at least one command prior to performing the telecommunication test, and wherein the telecommunication test module performs the telecommunication test autonomous to the computer system.

8. The modular telecommunication test system of claim 6, wherein while performing the telecommunication test, the telecommunication test module acquires telecommunication test data and provides the telecommunication test data to the computer system.

9. The modular telecommunication test system of claim 1, wherein the computer system weighs less than 10 pounds and includes a battery power supply.

10. The modular telecommunication test system of claim 1, wherein each of the plurality of telecommunication test modules weighs less than 5 pounds and includes a battery power supply.

11. A modular telecommunication test system, comprising:
a first computer system, wherein the first computer system stores a telecommunication test application;
a communication hub adapted for coupling to the first computer system;
a first telecommunication test module located external to the first computer system and including:
electrical circuitry for performing a first set of telecommunication tests upon a first type of telecommunication service installation; and
a first communication port adapted for coupling to the communication hub in order to configure the modular telecommunication test system for performing the first set of telecommunication tests;
a second telecommunication test module located external to the first computer system and including:
electrical circuitry for performing a second set of telecommunication tests upon a second type of telecommunication service installation; and
a second communication port adapted for coupling to the communication hub in order to configure the modular telecommunication test system for performing the second set of telecommunication tests;
wherein the first and second telecommunication test modules are selected from a plurality of telecommunication test modules;
wherein the first telecommunication test module is operable to receive commands from the computer system in order to configure the modular telecommunication test system for performing the first set of telecommunication tests;
wherein the second telecommunication test module is operable to receive commands from the computer system in order to configure the modular telecommunication test system for performing the second set of the telecommunication tests;
wherein the first telecommunication test module performs the first set of telecommunication tests autonomous to the computer system; and
wherein the second telecommunication test module performs the second set of telecommunication tests autonomous to the computer system.

12. The modular telecommunication test system of claim 11, wherein the first and second types of telecommunication service installations are different types of telecommunication service installations selected from the group consisting of POTS, T1/E1, ISDN, and xDSL.

13. The modular telecommunication test system of claim 12, wherein each of the plurality of telecommunication test modules includes electrical circuitry for performing a set of telecommunication tests upon a different type of telecommunication service installation selected from the group consisting of POTS, T1/E1, ISDN, and xDSL.

14. The modular telecommunication test system of claim 11, wherein during operation the communication hub is coupled to the first computer system and the first and second telecommunication test modules are coupled to the communication hub.

15. The modular telecommunication test system of claim 14, wherein the first computer system produces commands while executing the telecommunication test application, and wherein the first computer system provides the commands to the communication hub, and wherein the communication hub provides the commands to both the first and second telecommunication test modules.

16. The modular telecommunication test system of claim 15, wherein the first and second telecommunication test modules are assigned different addresses, and wherein each of the commands produced by the first computer system includes an address of a telecommunication test module coupled to the first computer system and forming a part of the telecommunication test system.

17. The modular telecommunication test system of claim 16, wherein when the first telecommunication test module receives a command including the address of the first telecommunication test module, the first telecommunication test module performs one of the first set of telecommunication tests dependent upon the command.

18. The modular telecommunication test system of claim 17, wherein while performing the telecommunication test, the first telecommunication test module acquires telecommunication test data and provides the telecommunication test data to the communication hub, and wherein the telecommunication hub provides the telecommunication test data to the first computer system.

19. The modular telecommunication test system of claim 11, wherein the first computer system weighs less than 10 pounds and includes a battery power supply.

20. The modular telecommunication test system of claim 11, wherein each of the plurality of telecommunication test modules weighs less than 5 pounds and includes a battery power supply.

21. The modular telecommunication test system of claim 11, wherein the first and second telecommunication test modules include stacking ports for connecting the first and second telecommunication test modules together.

22. The modular telecommunication test system of claim 11, further comprising a second computer system coupled to the first computer system, wherein the first computer is coupled to receive telecommunication test data from the first and second telecommunication test modules and configured to provide the telecommunication test data to the second computer system.

23. The modular telecommunication test system of claim 1, wherein the telecommunication test module and the computer system operate together to perform the telecommunication test when the telecommunication test module is coupled to the computer system.

24. The modular telecommunication test system of claim 1,
wherein the computer system and the telecommunication test module have separate enclosures and power supplies.

25. The modular telecommunication test system of claim 1, further comprising:
a plurality of telecommunication test modules;
wherein one or more of the plurality of telecommunication test modules are selectable by a user to be coupled to the computer system for performing the telecommunication test.

26. The modular telecommunication test system of claim 1, further comprising:
a plurality of telecommunication test modules;
wherein the computer system includes a display;
wherein one or more of the plurality of telecommunication test modules are coupled to the computer system; and
wherein the display of the computer system is operable to display a graphical symbol corresponding to each of the one or more of the plurality of telecommunication test modules coupled to the computer system.

27. The modular telecommunication test system of claim 1, further comprising:
a plurality of telecommunication test modules coupled to the computer system, wherein each of the plurality of telecommunication test modules is external to the computer system.

28. The modular telecommunication test system of claim 1, wherein the telecommunication test module is coupled to the computer system, wherein the telecommunication test module is external to the computer system when the telecommunication test module is coupled to the computer system.

29. The modular telecommunication test system of claim 1, wherein the telecommunication test module is coupled to the computer system through a cable.

30. The modular telecommunication test system of claim 1, further comprising:
a plurality of telecommunication test modules;
wherein one or more of the plurality of telecommunication test modules are coupled to the computer system; and
wherein a telecommunication test associated with the one or more of the plurality of telecommunication test modules may be activated when the one or more of the plurality of telecommunication test modules are coupled to the computer system.

31. A method for configuring a telecommunication test system, comprising:
storing a telecommunication test application on a computer system;
providing a plurality of telecommunication test modules, wherein each of the plurality of telecommunication test modules includes electrical circuitry for performing a particular telecommunication test, wherein each of the plurality of telecommunication test modules further includes a communication port for connecting to the computer system;
selecting one or more telecommunication test modules in response to user input, wherein each of the one or more telecommunication test modules is selected based on a type of telecommunication service installation desired to be tested;
coupling said one or more telecommunication test modules to the computer system, wherein said one or more telecommunication test modules are external to the computer system when coupled to the computer system, wherein said coupling operates to configure the telecommunication test module for performing the telecommunication test, wherein said configuring operates to prepare the telecommunication test module to receive commands from the computer system comprising the telecommunication test;
the computer system providing one or more commands to the one or more telecommunication test modules; and
performing the telecommunication test using the telecommunication test system, wherein said performing the telecommunication test comprises:
the one or more telecommunication test modules receiving a telecommunication signal from the telecommunication service installation;
the one or more telecommunication test modules performing at least a portion of the telecommunication test on the telecommunication signal based on the one or more commands to generate test results; and
the one or more telecommunication test modules providing the test results;
wherein said performing the telecommunication test further comprises performing the telecommunication test autonomous to the computer system.

* * * * *